No. 787,569. PATENTED APR. 18, 1905.
F. R. FRENCH, DEC'D.
M. H. FRENCH, ADMINISTRATRIX.
AERIAL CABLEWAY.
APPLICATION FILED SEPT. 5, 1903.

Witnesses,

Inventor,
Frederick R. French
By Geo. H. Strong
Atty.

No. 787,569. PATENTED APR. 18, 1905.
F. R. FRENCH, DEC'D.
M. H. FRENCH, ADMINISTRATRIX.
AERIAL CABLEWAY.
APPLICATION FILED SEPT. 5, 1903.

No. 787,569. PATENTED APR. 18, 1905.
F. R. FRENCH, DEC'D.
M. H. FRENCH, ADMINISTRATRIX.
AERIAL CABLEWAY.
APPLICATION FILED SEPT. 5, 1903.

No. 787,569. PATENTED APR. 18, 1905.
F. R. FRENCH, DEC'D.
M. H. FRENCH, ADMINISTRATRIX.
AERIAL CABLEWAY.
APPLICATION FILED SEPT. 5, 1903.

Witnesses,
Inventor,
Frederick R. French
By Geo. H. Strong
Atty

No. 787,569. PATENTED APR. 18, 1905.
F. R. FRENCH, DEC'D.
M. H. FRENCH, ADMINISTRATRIX.
AERIAL CABLEWAY.
APPLICATION FILED SEPT. 5, 1903.

Witnesses,
Inventor,
Frederick R French
By Geo. H. Strong. atty

No. 787,569. PATENTED APR. 18, 1905.
F. R. FRENCH, DEC'D.
M. H. FRENCH, ADMINISTRATRIX.
AERIAL CABLEWAY.
APPLICATION FILED SEPT. 5, 1903.

Patented April 18, 1905.

UNITED STATES PATENT OFFICE.

FREDERICK R. FRENCH, OF SAN FRANCISCO, CALIFORNIA; MARTHA HATHAWAY FRENCH ADMINISTRATRIX OF SAID FREDERICK R. FRENCH, DECEASED.

AERIAL CABLEWAY.

SPECIFICATION forming part of Letters Patent No. 787,569, dated April 18, 1905.

Application filed September 5, 1903. Serial No. 172,078.

*To all whom it may concern:*

Be it known that I, FREDERICK R. FRENCH, a citizen of the United States, residing in the city and county of San Francisco and State of California, have invented new and useful Improvements in Aerial Cableways, of which the following is a specification.

My invention relates to apparatus for the movement of a burden or burden-carrier in either a horizontal or a vertical direction by means of cables suspended between two supports and adapted automatically to dump a burden in mid-air from the containing burden-carrier at the will of the operator.

Having reference to the accompanying drawings, Figs. 15 to 25, inclusive, are illustrative of the details of system shown in Fig. 2. Figs. 49 to 55, inclusive, are illustrative of details of system Fig. 5. Figs. 56 to 62, inclusive, are illustrative of details of system Fig. 6. Figs. 63 to 73, inclusive, are illustrative of the details of system Fig. 7.

The apparatus consists, essentially, of a single-track cable $d$, as in Figs. 4, 6, and 8, or two parallel track-cables $a$ $a'$, as in Figs. 1, 2, 3, 5, 7, and 9, (which cables $a$ $a'$ in these figures combine also the functions of fall-rope-supporting ropes,) suspended between two points or towers A B, along which a carriage C is made to traverse in either horizontal direction by means of endless inhaul and outhaul cables $c$ $c'$, operated by any suitable power-driven hoist; a double fall-line $b$ $b'$, as shown in Figs. 1, 2, 4, 7, and 8, or a single one, $b$, as in Figs. 3, 5, 6, and 9, extending from the hoist over the nearest point of support for trackcables or tower A, thence to the carriage, and suspending from the carriage a burden-carrier, or, as will hereinafter be designated, one or more "fall-blocks," which in turn support the load or burden to be transported; a device $i$ for supporting the fall rope or ropes and secured to the fall-rope-supporting ropes (designated throughout the specification by letters $a$ $a'$) and disposed at suitable intervals, designated as "fall-rope carriers;" and an arrangement for discharging the burden in mid-air, which will be termed the "aerial dump," all of which will be separately and completely described later on. The support nearest the hoist will be termed the "head-tower" A and that at the other end of the system will be termed the "tail-tower" B.

The chief difficulty to be contended with in all hoist and conveying devices of the character herein considered is to suitably support that portion of the fall-line which exists between the carriage and head-tower, which is essential to the practical operation of the system, for if these lines were not so supported their excessive sag would become objectionable, and the tension in the fall line or lines beyond a certain limited distance of the carriage from the head-tower, due to the weight of the lines themselves, would exceed that due to any practical weight of the fall block or blocks, thus causing same to ascend to the carriage and so remain, defeating the practical object of the system for hoisting purposes. It is also desired to dump or discharge burdens contained in the burden-carrier, usually in the form of a box and designated as a "scale-pan," in mid-air at any point along the suspended cables and at any distance from same at the will of the operator without danger of premature discharge and resulting inconvenience and danger to life.

The object of my invention is to provide a suitable support for the fall-lines and a safe method of dumping in mid-air. Most of the other details of the system are common to a large variety of hoist and conveying apparatus, but will be briefly described, as they are common to all of the systems herein, having reference to the accompanying drawings.

The inhaul and outhaul cables (designated, respectively, by the letters $c$ and $c'$) are employed to move the carriage C in either horizontal direction. These cables are endless around the drum S in a suitable hoist, which has a concave periphery whereby the turns of rope are crowded in always toward the center and made to grip the drum more tightly. To move the carriage to the right, this drum is made to revolve so its top turns to the left, which will cause cable $c$ to be taken up at same rate of speed as cable $c'$ is paid off, resulting in a traverse of the carriage toward the head-tower A as cable $c$ passes from the hoist over sheave $j$ in head-tower to the carriage, where it is made fast, and cable $c'$ passes from the hoist to sheave $j'$ in head-tower, thence over sheave $k$ in tail-tower B to the carriage C, where it is made fast. To move the carriage to the left, the drum S is moved so its top passes to the right, which results in a reversal of all motions. The drum S', which operates the fall-lines $b$ and $b'$ or line $b$, as in systems represented by Figs. 3, 5, 6, and 9, is made of the same diameter as the drum S and so geared with it that it may be caused to revolve in unison with it or independent of it. When revolving in unison, the cables $c$, $b$, and $b'$ will be taken in or paid out at the same rate of speed, which results in the distance between the carriage and fall-blocks remaining fixed, as is often desired, while the carriage is moving in either horizontal direction. It is evident that when drum S' is revolved and drum S is held stationary the fall-blocks will move vertically up if top of drum moves to left and down if to the right.

Figure 8:
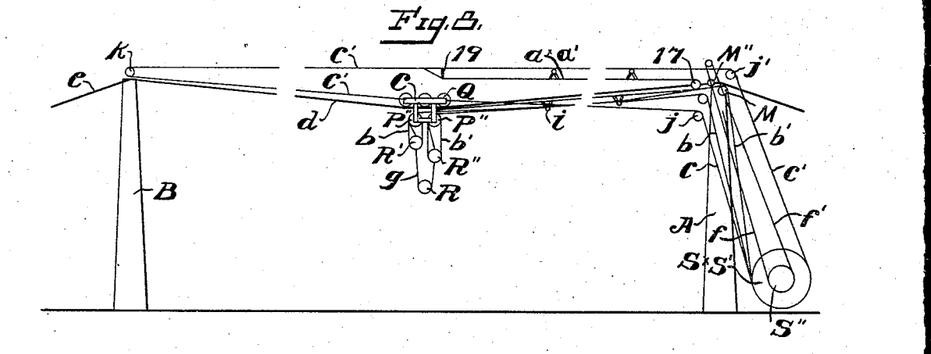
Figure 9:
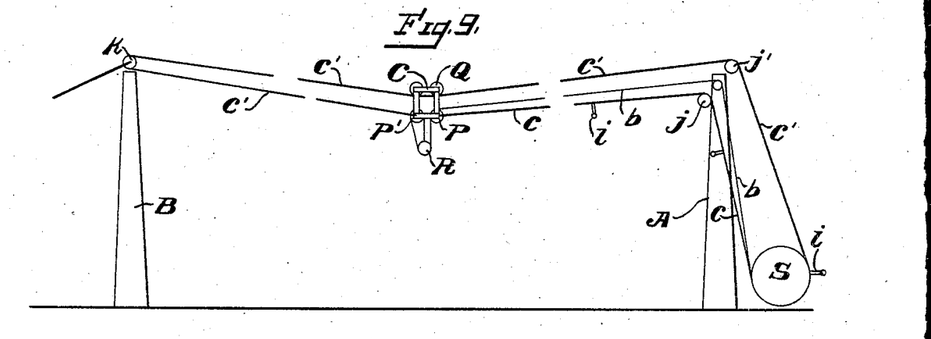

The fall-rope carriers $i$ consist of connections or bridges from one cable to another parallel cable carrying a suitable roller centrally below the two parallel cables, above which the fall lines or line have their position, thus being supported by the rollers when they have a tendency to sag. The rollers are to admit of a free traverse of the fall-lines. The two parallel cables which carry the fall-rope carriers are represented (except in system Fig. 9) by the letters $a$ and $a'$ and may be either the track-cables, as in Figs. 1, 2, 3, 5, and 7, or separate cables for that purpose only, as in Figs. 4, 6, and 8. In Fig. 9 the traction-cables $c$ $c'$ constitute also the track-cables and the fall-rope-carrier supports. In the first case where the standing or track cable is to be utilized for supporting the fall-rope carriers it is made in two units, or two track-cables instead of one are used of a combined strength of the one cable ordinarily employed, located at a short distance apart side by side, in which case the fall-rope carriers $i$ remain at fixed distances along the track-cables. In case special fall-rope-carrying ropes, as in Figs. 4, 6, 8, are to be used they are designed for supporting their own and the weight of the fall-rope only and extend from the carriage, where they are made fast to the head-tower, around sheaves 17 and to a fastening on the outhaul-cable, as shown. In this arrangement the fall-rope carriers traverse in unison with the carriage, remaining at fixed distances from it along the fall-rope-supporting ropes.

The second feature of the invention is the aerial dump, which consists of dividing the fall-rope into two units of a combined strength required of one rope and so connecting same with the burden that each will carry an equal amount of the load and an arrangement whereby one rope is made to have motion relative to the other and by so doing cause the rear of the scale-pan to elevate and the burden to slide out, as desired.

The details of the various applications of the fall-rope carriers and aerial dump will now be fully described.

Figure 1:
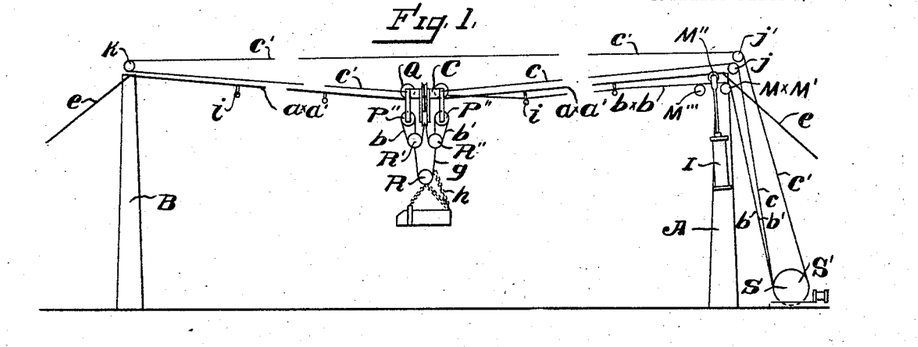
Figures 1, 2, 3, 4, 5, 6, 7, 8, and 9 are illustrative of various forms of hoisting and conveying apparatus embodying the principles of my invention.
Figure 10:
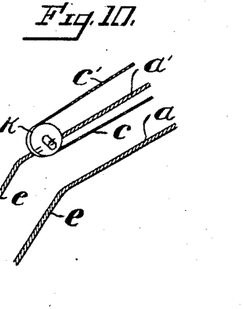
Fig. 10 is a detail of the cable and pulley arrangement at the tail-tower according to system Fig. 1.
Figure 11:
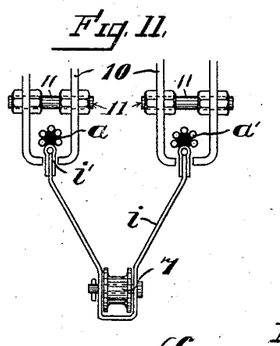
Fig. 11 is an end view of the fall-rope-supporting bridge, showing its connection with the fall-rope-supporting ropes as per Fig. 1.
Figure 12:
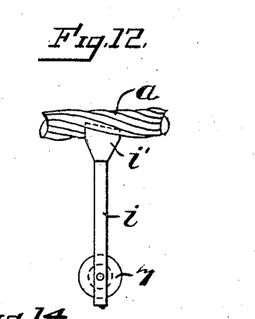
Fig. 12 is a side view of the same.
Figure 13:
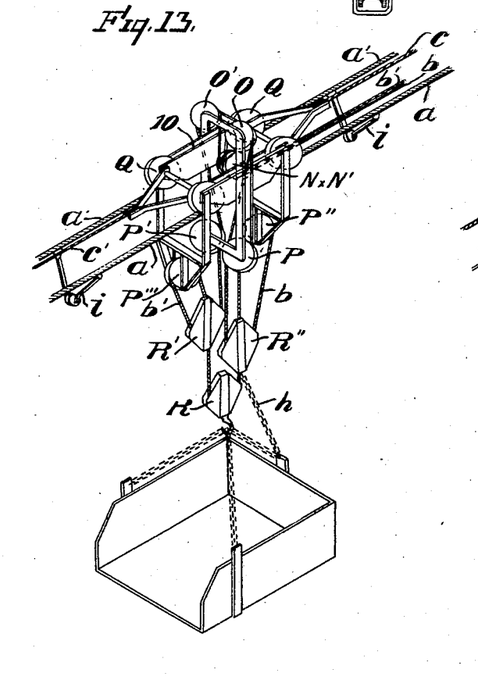
Fig. 13 is a perspective view of the carriage and aerial dump, Fig. 1.
Figure 14:
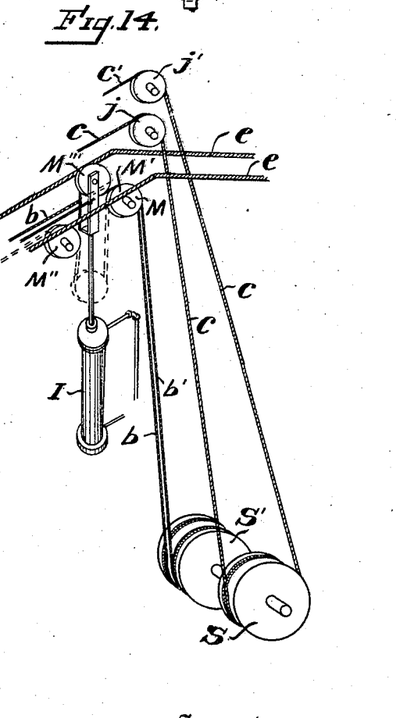
Fig. 14 is a diagrammatic view of the hoist end of the system shown in Fig. 1.

Referring to cableway Fig. 1, which is shown in detail in Figs. 10 to 14, inclusive, the track-cables $a$ and $a'$ are here two in number, to which are attached at suitable intervals the fall-rope carriers $i$, which are shown in detail by Figs. 11 and 12. They are attached to the lower strand of the track-cables $a$ and $a'$ by means of a metal band $i'$ passing around the strand and riveted to the arms of the fall-rope carrier, which carry the roller 7. It will thus be seen that no obstruction is offered to the free passage of the carriage-sheaves along the track-cables. The carriage is shown by Fig. 13 and has four track-sheaves Q, which run along the cables $a$ and $a'$. The fall-ropes $b$ and $b'$ (two in this case) pass from drum S' up over respective sheaves M and M' in tower A and approach the carriage between the track-cables $a$ and $a'$, passing around sheaves N and N' in the carriage, where they separate, one passing around sheave O in one direction and the other around the sheave O' in the opposite direction, thence downward, one around sheave P and the other around sheave P', to a position centrally beneath the track-cables $a$ and $a'$, from which point rope $b$ descends around sheave in fall-block R'', back around sheave P'', suspended from the carriage, and from there to the fall-block R''', where it is made fast. In a similar manner $b'$ descends around sheave R', up around sheave P''', and down to fall-block R', where it is made fast. By referring to Fig. 14 it will be seen that the cables $b$ and $b'$ are wound around the same drum S', which has a uniform diameter, and as the cables b and b' are of the same diameter they will be taken in or paid out at precisely the same rate of speed, causing the fall-blocks R' and R" to remain in the same relative position during any interval of revolution of the drum S' whether the same moves in unison with the drum S or independent of it. The hangers which support the sheaves P, P', P", and P'" are so designed as to freely clear the fall-rope carriers as the carriage passes along the track-cables. Also the sections of the fall-rope b and b' between the sheaves O P and O' P' clear the fall-rope carriers. The side connecting-plates 10, which join sheaves Q, have their lower edges bent at right angles in a manner shown in part section, Fig. 11, and so adjusted as to admit their passage by the fall-rope carriers, but not admit of the passing through or exit of the track-cables a and a', thus maintaining the track-cables in a central and near position below the track-sheaves Q, preventing the carriage from jumping the track-cables a and a', as is sometimes the tendency, owing to the rebound caused by suddenly-released burdens resulting from fastenings breaking or slipping. The carriage in this system is permitted to pass the fall-rope carriers without coming in contact with them. The burden is supported centrally beneath the track-cables a and a', assuring stability of the carriage at all times, and the fall-ropes are effectively supported. The advantages of this system are the complete elimination of any shock or jar caused by the passage of the carriage along the track-cables, which has proved a source of annoyance in several forms of cableways, thus permitting the burdens to be transported in horizontal directions at a high rate of speed without resulting injury to parts of the arrangement, at the same time requiring the fall-lines to pass from the head-tower to the carriage and fall-blocks only, it not being necessary that they pass around the tail-tower also with resulting loss by friction, consumption of power, expense of rope, &c., as is the case in a variety of cableways where the use of fall-rope carriers has been eliminated.

*Aerial dump.*—As has been shown, the two fall-blocks R' and R", Fig. 13, maintain always the same relative position when moved by the hoist. These fall-blocks are joined by a short flexible connection g, passing around a sheave in fall-block R, to which the burden is attached. Fall-block R" is joined by a chain h or other suitable connection to the rear of the scale-pan. The scale-pan is so suspended from the fall-block R as to remain in an upright position when the trip-line h is slack. It will be seen that the scale-pan when moved in either vertical or horizontal direction by the hoist will remain always upright, as the fall-blocks R' and R" have been shown to have no motion relative to each other, and so permitting h to remain slack. If, however, fall-block R" is made to move up with reference to fall-block R', it will carry also the trip-line h, which will elevate the rear of the scale-pan to any desired angle, whereupon the material contained in the scale-pan will slide out and the aerial dump be accomplished. To cause this elevation of fall-block R" with reference to R', it is necessary to shorten the portion of the fall-line b between the sheave M in the head-tower and the fall-block R" with reference to that portion of line b' between sheave M' and fall-block R', which is accomplished by drawing a portion of the fall-line b down between sheaves M and M" by means of a sheave M'", that is suitably held by guides and operated by a steam, air, or water pressure cylinder 1, which maintains the sheave M'" in a position centrally above the fall-line b and clearing same, in which position it remains, except at such times as it is desired to make a dump, whereupon the piston in the cylinder is reciprocated to pull down on sheave M'", as indicated in dotted lines, Fig. 14, shortening rope b relative to b', thus elevating the rear of scale-pan to proper angle and allowing contents to slide out as is desired. The novel and desirable features claimed for this device are: The two fall-lines carry an equal share of the burden to be transported, as is not the case where a separate trip-line is used. It admits of a dump being made independent of the hoist without shock, jar, or danger of accident, as is the case in many such devices. Also a particularly advantageous feature of this arrangement is the fact of the two fall-lines being of the same diameter, which results in their having each precisely the same travel as caused by the hoist, which insures absolutely no relative movement of fall-blocks R' and R" during the traverse of the carriage along the cable a and a', as would be the case were the two fall-lines b and b' of different diameters, as is customary to make them where separate trip-lines are used. This slight difference in travel of the two lines sometimes causes a relative movement of the main fall-block and the trip-line block and in cases of long space is sometimes sufficient to cause the load to be prematurely discharged, with resulting inconvenience and danger to life, which occurrence cannot take place in the device here described at any time, since discharge is only possible when pressure is admitted by the operator to top side of the piston in cylinder at head-tower. It is also manifest that an economy of rope is effected over any system using an independent trip-line by the amount of the cost of such a trip-line.

Fig. 10 shows the arrangement at the head-tower. The cables $a$ and $a'$ may be joined at the towers and single guy-cables used, or two separate guys $e$ and $e'$ may be used, as shown.

Figure 2:
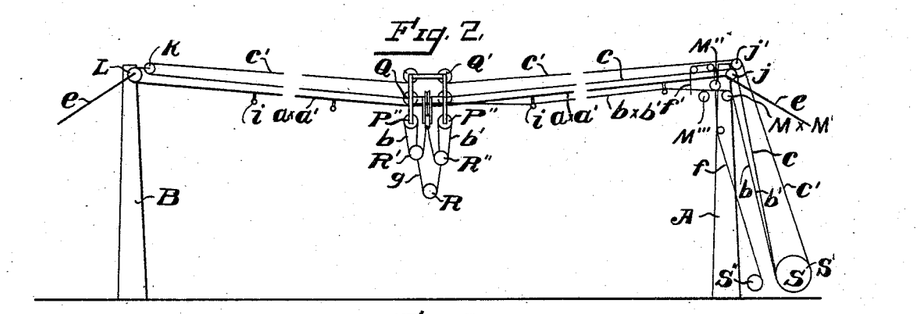
Figures 15, 16, 17, 18, 19, 20, 21, 22, 23, 24, 25:
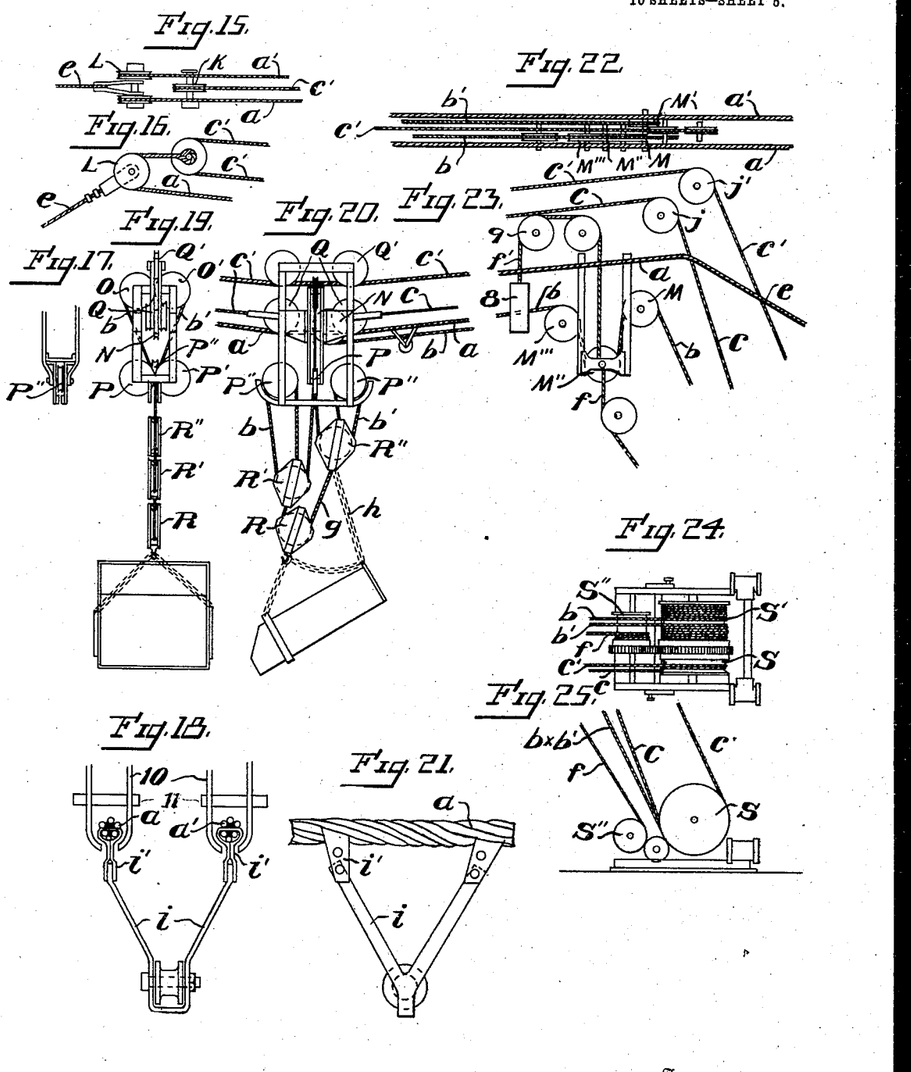

Cableway Fig. 2 is shown in detail by Figs. 15 to 25, inclusive, and differs from cableway Fig. 1 in that the inhaul and outhaul cables $c$ and $c'$ are joined with the track-cables $a$ and $a'$ at the tail-tower, Figs. 15 and 16, in such a manner that the tension on cables $a$, $a'$, $c$, and $c'$ are the same. The outhaul-cable $c'$ passes under sheaves Q' in the carriage. Thus cables $a$, $a'$, $c$, and $c'$ each support one-quarter the load which comes from the carriage, and in this arrangement a saving of cable is effected, the combined strength of cables $a$, $a'$, $c$, and $c'$ being required equal only to that of the cables $a$ and $a'$ in cableway of Fig. 1. The aerial dump is accomplished by a third drum S'', located in the hoist in place of cylinder 1, as in cableway Fig. 1, and so geared to the hoist as to remain stationary or move in either direction independent of the other two drums. When it is desired to dump, drum S'' is made to revolve so its top moves to the right, thus winding up the cable $f$, which is connected with the sheave M'', held in guides, and also connected with a weight 8 by a flexible cord over sheaves 9. As the cable $f$ is wound up sheave M'' will be drawn down between sheaves M and M''', as desired, and cause the dump, as before described. When the drum S'' is released, the counterweight 8, which was elevated when sheave M'' was depressed, will descend a like amount, restoring sheave M'' to its upper position, where it remains free of the fall-rope until another dump is required. The fall-rope carriers $i$ here have two arms on each side to insure greater stability in a direction along the track-cables and are attached to cables $a$ and $a'$ by a metal band $i'$, containing a number of strands of the standing cables. Bolts 11 are for a proper adjustment of space between side plates 10, accomplished by means of right and left hand threads, as shown.

Figure 3:
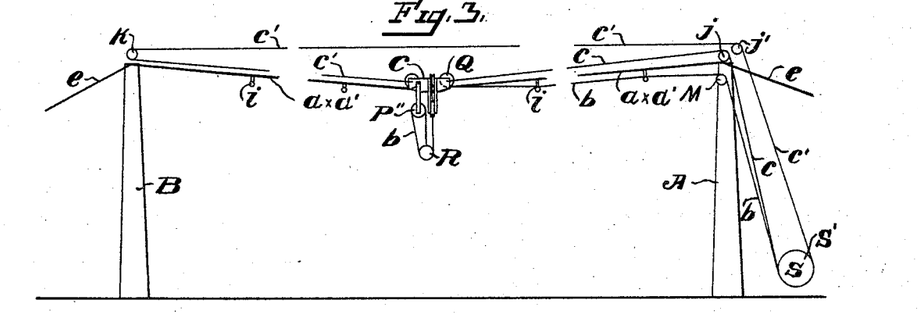
Figure 4:
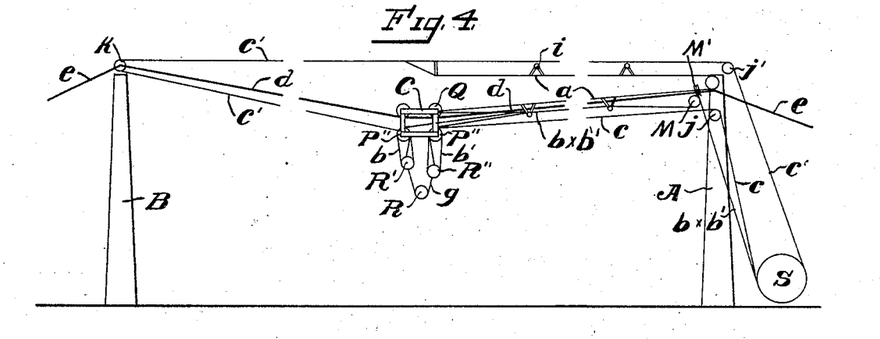
Figures 26, 27, 28, 29, 30, 31, 32, 33, 34, 35, 36:
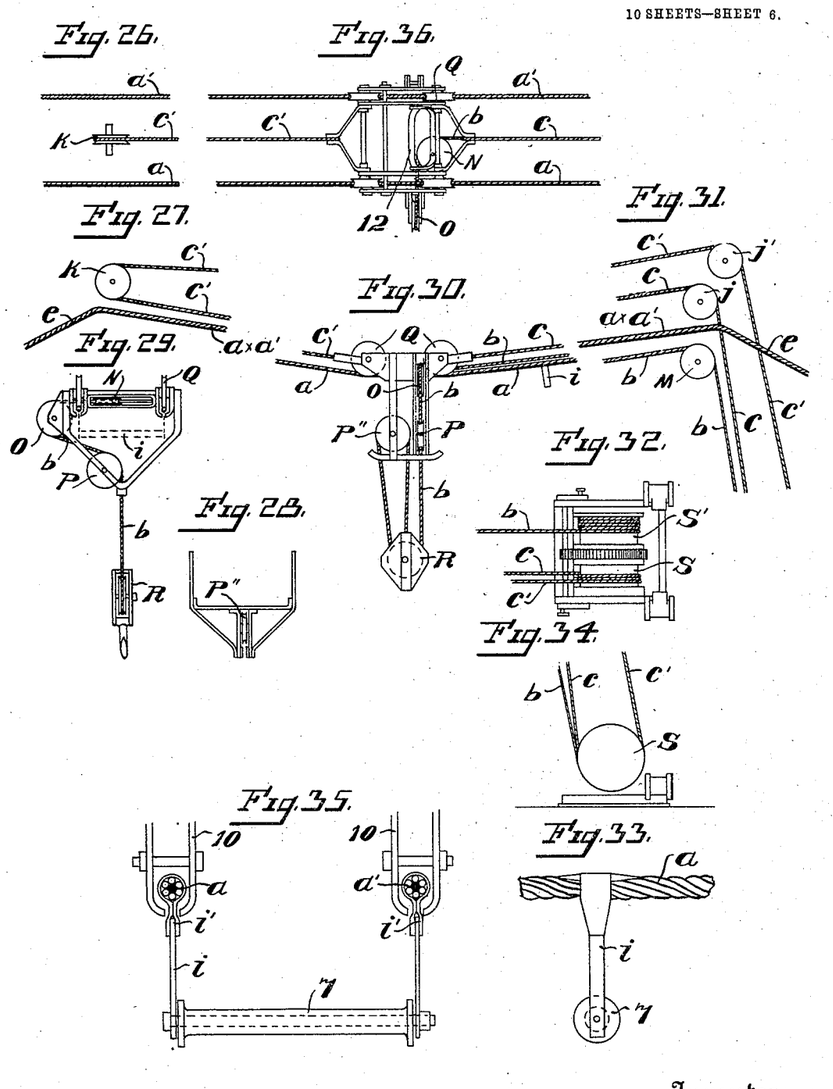
Figs. 26 to 36, inclusive, are illustrative of the details of system Fig. 3.
Figures 37, 38, 39, 40, 41, 42, 43, 44, 45, 46, 47, 48:
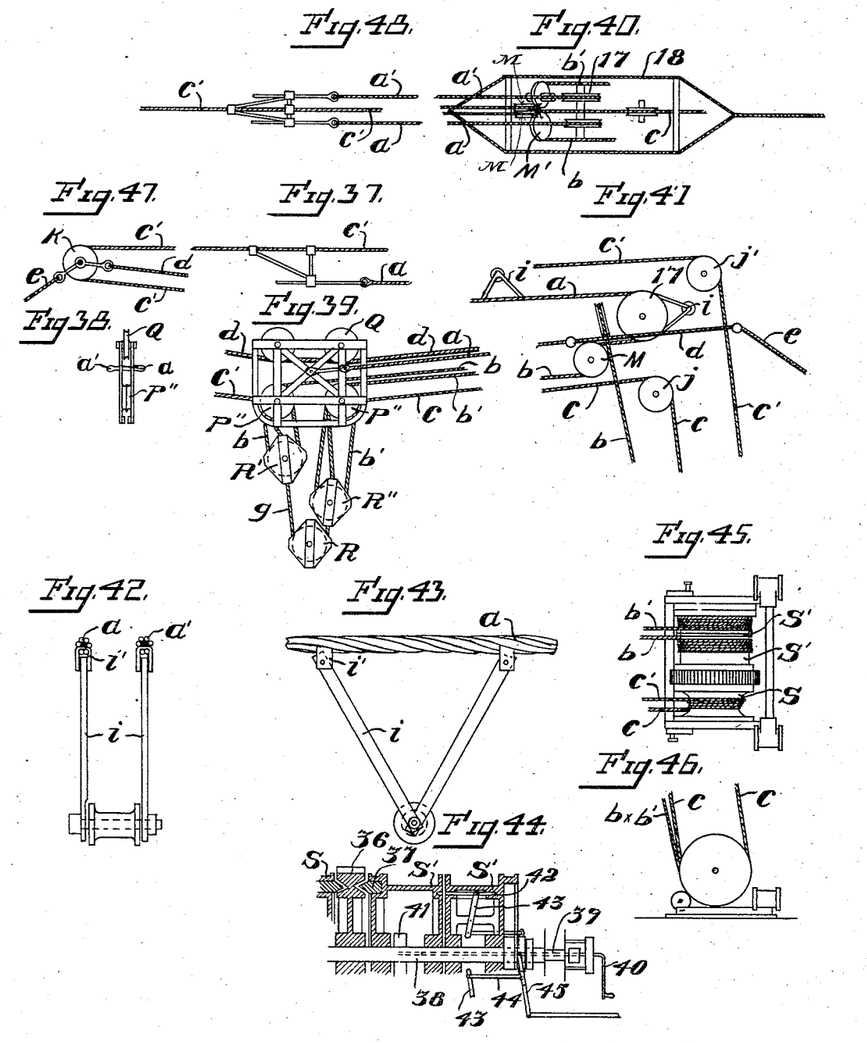
Figs. 37 to 48, inclusive, are illustrative of the details of system Fig. 4.

Cableway Fig. 3: A different arrangement of fall-line-direction sheaves in carriage is here employed. The single fall-line $b$ passes around sheave N, which in this case lies in a horizontal position and is carried by a frame pivoted on the axle 12, whence it passes through a centrally-located hole in axle 12 to sheave O, thence over sheave P, down around sheave in fall-block R, up around sheave P'' in carriage, and down to fall-block R, where it is made fast. Fig. 29 shows an end view of the carriage, and dotted lines show position of fall-rope carrier $i$ when carrier is over same. The fall-rope carriers, as shown by Figs. 35 and 33, are here attached to the track-cables by bands passing entirely around the track-cables, with their upper edges beveled, as shown by Fig. 33. Fig. 28 shows the portion of the frame which suspends sheave P'' from the carriage-frame, and Fig. 29 shows, together with other parts, the frame which supports sheave P from frame of carriage.

Figure 7:
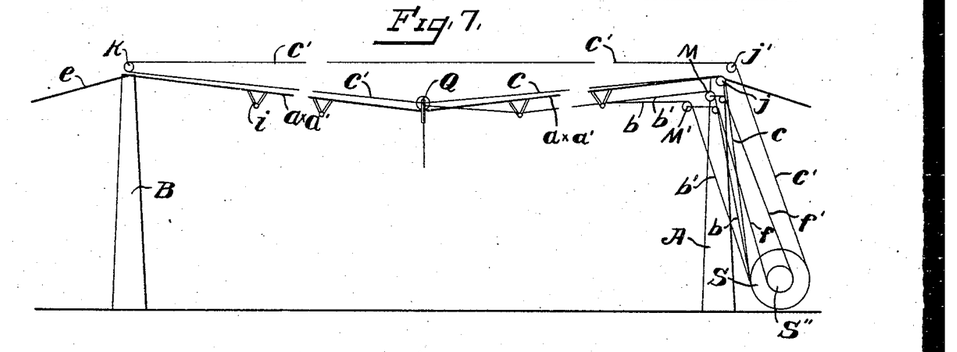
Figures 54, 59, 60, 62, 63, 65, 66, 67, 69, 70, 71:
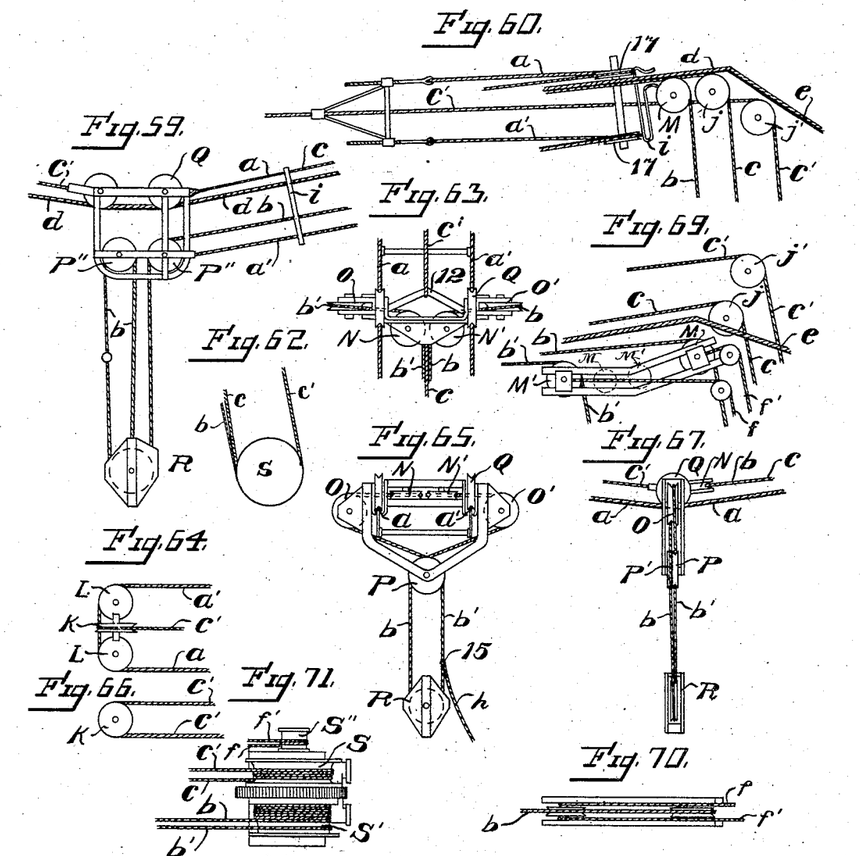
Figures 68, 72:
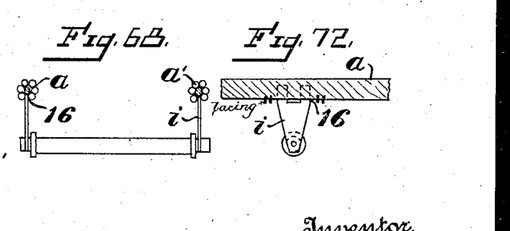
Figure 73:
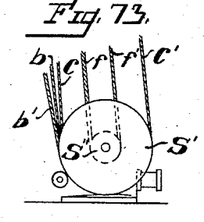
Figure 74:
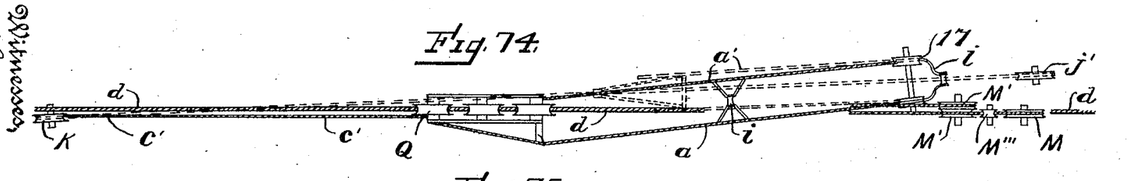
Fig. 74 is a plan view of system Fig. 8.

Cableway Fig. 7 is shown in detail by Figs. 63 to 73, inclusive. Here the track-cables $a$ and $a'$ are joined at the tail-tower, passing over sheave L, thus causing the tension track-cables $a$ and $a'$ to be equal at all times. The fall-lines $b$ and $b'$ approach the carriage centrally above cables $a$ and $a'$, $b'$ passing around sheave N, thence in a horizontal direction at right angles to the track-cables $a$ and $a'$, passing through holes centrally located in the axle 12 and over sheave O, thence over sheave P, and down to the ring 15. The fall-line $b$ in a similar manner passes around sheaves N', O', and P', thence to the ring 15, first passing around sheave in fall-block, to which it and fall-line $b'$ are both made fast. It will be seen that as fall-lines $b$ and $b'$, wound on the same drum S' in hoist, are taken up or paid out in unison the ring 15 will have no motion relative to the fall-block R, in which the sheave does not revolve, except when dump is being made, but will of course move up or down the same, as will the fall-block R. Ring 15 is connected by a flexible cord $h$ with the rear of the scale-pan in a manner such as will accomplish a dump when the ring 15 is moved up relative to fall-block R. This is accomplished in this case by a third drum on hoist S'', that is connected by cables $f$ and $f'$ with the sheaves M' and M in head-tower, which are confined within guides permitting of motion of sheaves to the position shown by dotted lines, which is accomplished by revolving drum S'', so that its top passes to the left, which causes cable $f'$ to pay out and cable $f$ to be taken up, permitting sheave M to move to the position indicated by dotted circle and hauling sheave M' to position indicated also by a dotted circle, thus simultaneously moving cable $b'$ to the right and cable $b$ to the left, which shortens cable $b'$ between carriage and ring 15 and lengthens cable $b$ between carriage and ring 15 and causing ring 15 to ascend relative to fall-block R and effecting the dump as required. This method of dumping differs from those previously described in that the scale-pan can be tilted without any shortening of the distance between it and the track-cables, which will admit of the piling of the dump close up under cables $a$ and $a$. The fall-rope carriers are here attached by the arms $i$, having their upper ends enlarged to occupy the space between the outside strands of the track-cables $a$ and $a'$, the lower two strands of which may be laced together, as shown, to prevent their spreading when weight is brought to bear on the fall-rope carriers. Referring to Fig. 63, the track-sheaves Q are loose on the axle 12, and the hanger which carries sheaves O, O', P, and P' is pivoted or hung on the ends of the same axle 12.

Figure 5:
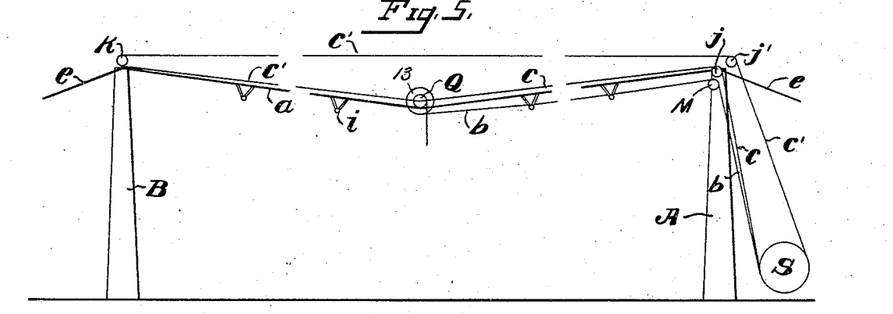
Figure 6:
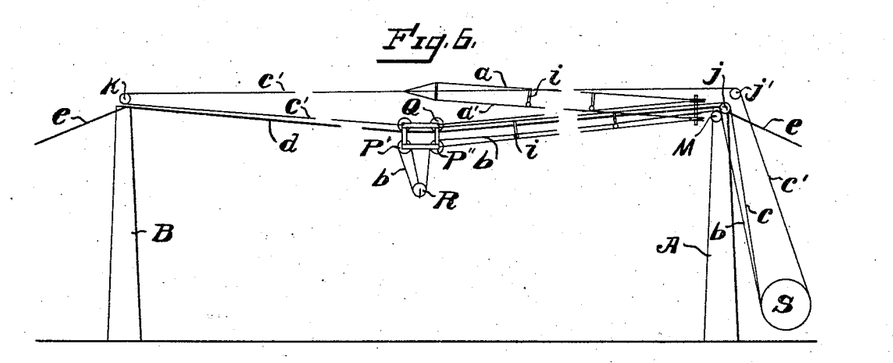

Cableway Fig. 5 is shown in detail by Figs.

Figures 49, 50, 53, 54, 55:
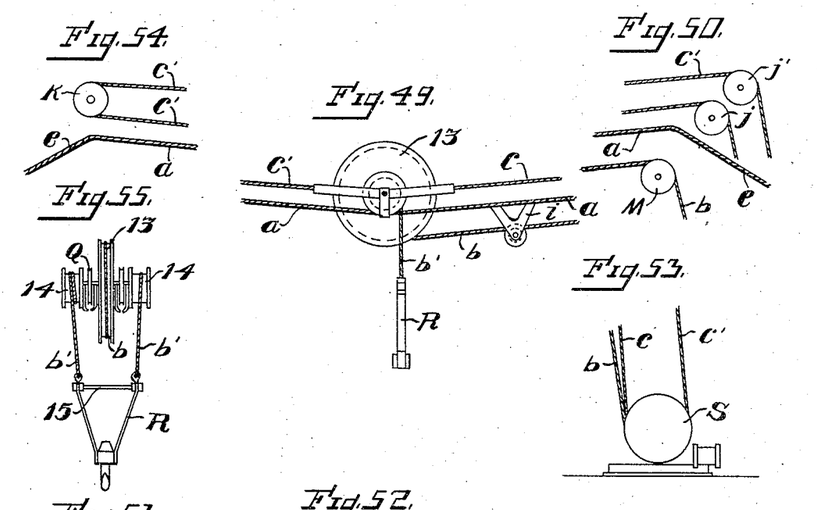

49 to 55, inclusive, and differs from any arrangement heretofore described in that the main fall-line $b$ terminates at the carriage, being fast to and wound around the drum 13, centrally located between cables $a$ and $a'$. Separate fall-lines $b'$, fastened to and wound around small drum 14, located outside the lines $a$ and $a'$, extend downward to a yoke arrangement R, to which the burden is attached. It is obvious that if cable $b$ is taken up by the hoist when cables $c$ and $c'$ are stationary the drum 13 will revolve, and as drums 14 are rigid on the same shaft as drum 13 they will also revolve and take up cables $b'$, thus causing R to rise, and if cable $b$ is paid out by the hoist the drums will be revolved in the opposite direction by reason of the weight of R and cable between it and the drums 14. The fall-rope carriers are attached by wire-lacing to the lower strands of cables $a$ and $a'$, which are located in suitable grooves made in the body of the arms $i$ to protect them from wear by any possible contact as the carriage passes along the track-cables. Fig. 54 shows the arrangement of sheaves and cables at the tail-tower. The track-sheaves Q are loosely journaled on same shaft which carries drums.

Figs. 4, 6, and 8 represent types where separate fall-rope-supporting ropes are used and the carriers move.

Cableway Fig. 4 is shown in detail by Figs. 37 to 48, inclusive. Here but one main or track cable is used, (lettered $d$,) and the fall-rope-supporting ropes are shown by letters $a$ and $a'$. The fall-lines $b$ and $b'$ pass from the drums S' and S' up to sheaves M' in the head-tower, passing outside the positions of cables $a$ and $a'$ from the sheaves M', and thence around sheaves M to a position centrally between $a$ and $a'$ and below them. From there they run to the carriage, one passing over sheave P'' to fall-block R'', thence around a sheave alongside of sheave P'', and then down to the fall-block R'', where it is made fast. Fall-line $b'$ in a similar manner connects fall-block R' and the carriage. The fall-rope-supporting ropes $a$ and $a'$ extend from side brackets on the carriage around sheaves 17 in head-tower, thence to a fastening on outhaul rope $c'$. (Shown in Figs. 48 and 37.) The ends of $a$ and $a'$ are arranged for suitable adjustment. The track-cable $d$ is attached to a spreader 18 at the head-tower to admit of the free passage of the fall-rope carriers up around sheaves 17. In operation the carriage is drawn along the cable $d$, causing the cables $a$ and $a'$ to move at same rate of speed as cables $c$ and $c'$ and in opposite directions, thus carrying the fall-rope carriers $i$ along in a position to support the fall-lines when necessary. One feature of this arrangement is that the fall-lines traverse the rollers of the fall-rope carriers only during the vertical movement of the fall-blocks, not when the carriage is being hauled along the standing cable $d$, which is desirable, as the rollers are thus subject to little wear. The aerial dump is here accomplished by winding fall-lines $b$ and $b'$ on two separate drums S', Fig. 44, which are adapted to be locked together to operate in unison on occasion with drum S or one to be operated and the other held stationary to give a relative motion causing the dump. Drums S and S' are operated from the main drive-gear 36 by means of friction devices 37. Gear 36 is fast on shaft 38, while the drums are loose thereon. In the drawings shaft 38 is shown as carrying a screw 39, operatable by a suitable crank 40, to carry a cross-head 41, swiveled on the end of the screw and movable in a longitudinal slot in the shaft to carry the inner drum S' up against or out of engagement with gear 36. The two drums S' may be locked together by pins 42, which are reciprocated by means of the levers 43 inside the outer drum, the rods 44, and the forked lever 45, the rods 44 being slidable in the hub of the outer drum. The fall-rope carriers are so arranged that both extremities of the arm $i$ are hinged, permitting them to pass freely around the sheaves 17.

Figures 51, 52, 56, 57, 58, 61:
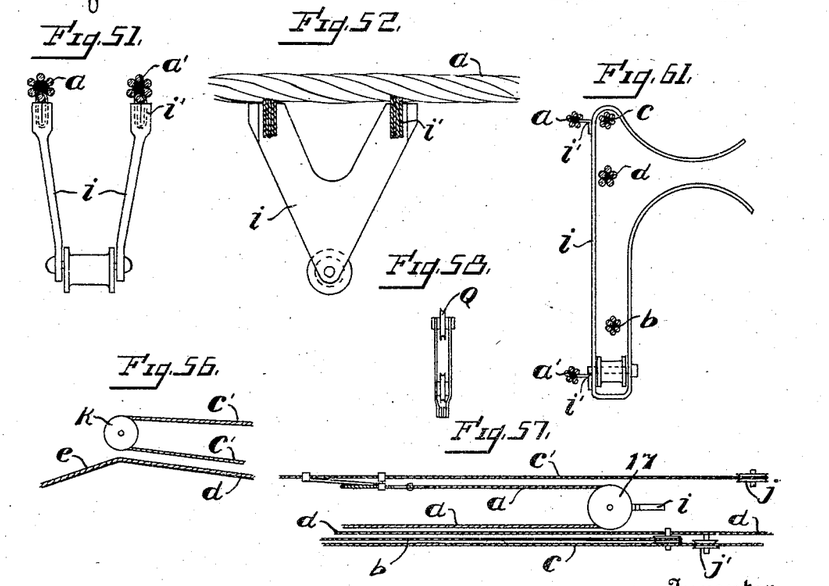

Cableway Fig. 6 is shown by sketches Figs. 56 to 62, inclusive. This cableway is similar to the one just described, except that the cables $a$ and $a'$ pass around horizontal sheaves 17 instead of vertical ones in the head-tower, Figs. 57 and 60, and the fall-rope carriers, Figs. 60 and 61, are so arranged in conjunction with the cables at head-tower as to admit of the cables $c$, $d$, and $b$ passing within or passing out of the frame of the carriers as they pass around the sheaves 17. Fall-rope $b$ passes from drum S' over pulley M in head-tower, thence around pulley P'' in carriage, through fall-block R, around second pulley P'', and attached to fall R.

Cableway Fig. 8: This arrangement is similar to cableway Fig. 4, but is designed to do away with the sheaves M' (shown in Fig. 41) by directing the fall-rope-supporting ropes $a$ and $a'$ so that as they pass around sheaves 17 they will just clear the standing cable $d$ and attaching their ends to the carriage in such a position that the center line between $a$ and $a'$ will be approximately under the center of the standing cable $d$ at a point midway between the carriage and head-tower, thus providing a fall-rope carrier under the fall-ropes, as desired. The aerial dump is accomplished by means of a third drum on engine.

Figure 75:
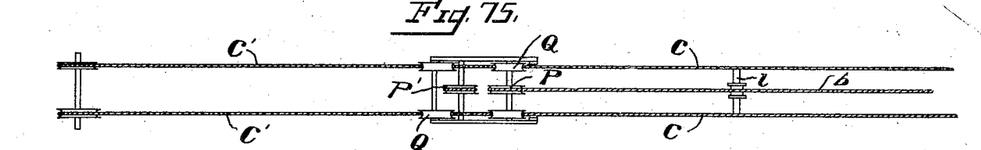
Fig. 75 is a plan view of 40 system Fig. 9.
Figure 76:
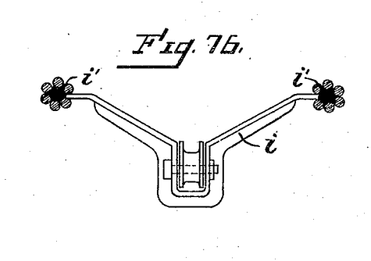
Fig. 76 shows a fall-rope carrier for same.
Figure 77:
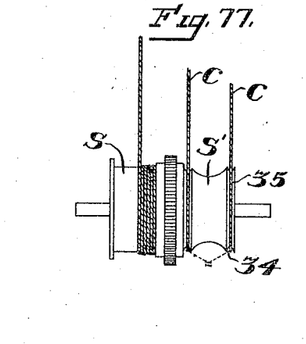
Fig. 77 shows a drum-hoist for same.

Cableway Fig. 9 (further illustrated by Figs. 75, 76, 77) shows the application of the bridge-fall-rope carriers, in which there are no standing cables, the track, inhaul, outhaul ropes, and fall-rope-supporting ropes being all combined into one set of two ropes $c$ and $c'$, which are side by side and joined at suitable intervals by the bridges or fall-rope carriers $i$, as shown. The fall-rope carriers are so joined to the cables $c$ and $c'$ as to permit their free passage over sheaves $j''$ $j$ in head-towers and around the drum S' in the hoist. 34 shows in dotted lines the position of fall-rope carriers when passing under the drum S'. The grooves in drum S', around which cables $c$ and $c'$ pass, may be plain if grip is sufficient, or the grooves may be equipped with any one of several well-known devices for clamping the cable in order to increase the hauling power of the cables $c$ and $c'$.

In all these forms there is present the same principle of an aerial cableway having two parallel cables, sometimes stationary and sometimes movable, but in either case provided with spaced fall-rope supporters or bridges, which are always out of the way of the burden-carrier and entirely independent thereof, and, secondly, of an aerial dump having either a single fall-rope, which supports the entire burden, or two supporting fall-ropes, each sustaining an equal proportion of the load, said fall-ropes operatable from the hoist and so connected to the burden-carrier as to obviate the danger of premature discharge, yet at the same time allowing the dump to be made at any desired point.

Having thus described my invention, what I claim, and desire to secure by Letters Patent, is—

1. In hoisting and conveying apparatus, the combination of a hoist, a trackway, a carriage movable thereon, a fall-rope in two sections or units supported on said carriage and at one end of the trackway and extending to the hoist, fall-rope carriers and supporting means therefor, traction-ropes, said fall-rope sections each supporting an equal portion of the load and means for operating said fall-rope sections and traction-ropes correlatively.

2. In hoisting and conveying apparatus, the combination of a hoist, a trackway, a carriage movable thereon, traction-ropes, a fall-rope in two sections extending from the hoist, a burden-carrier supported equally by said sections, means for moving said fall-rope sections in unison with the traction-rope and means for moving one section relative to the other to dump the load.

3. In hoisting and conveying apparatus, the combination of a hoist, a trackway, a carriage thereon, traction means for said carriage, a fall-rope having a plurality of sections extending from the hoist, each sustaining an equal portion of the load, means for moving one section relative to another to effect the dump, means for operating the several sections in unison with the traction-ropes to prevent premature discharge.

4. In a hoisting and conveying apparatus, the combination of head and tail supports, parallel track-ropes between said supports, a carriage movable on the track-ropes, means for moving the carriage, a fall-rope and means for moving it in unison with the carriage movement, fall-rope carriers permanently fixed to the track-ropes and extending from one of said ropes to the other and maintained at fixed distances apart, said carriers disposed out of the range of action of the carriage and provided with a roller-support for the fall-rope, an aerial dump mechanism, connections between said dump mechanism and the fall-rope, means for directing the fall-rope above and outside of the track-ropes, and means whereby the dumping is effected by the operation of the fall-rope.

5. In hoisting and conveying apparatus the combination of a hoist, a trackway, a carriage thereon, traction-ropes, a fall-rope in two sections extending from the hoist to and beneath the carriage, blocks carried by said sections and each supporting an equal portion of the load, a burden-carrier intermediate of said blocks, fall-rope-supporting ropes independent of the fall-rope, fall-rope carriers and means for moving the fall-ropes and traction-ropes in unison.

6. In a hoisting and conveying apparatus, the combination of head and tail supports, track-ropes intermediate of said supports, a carriage movable on said track-ropes, means for moving the carriage, a fall-rope operated from the hoist, fall-rope carriers on the track-ropes, a burden-carrier suspended from the fall-rope beneath the carriage and direction-pulleys upon the carriage for conducting the fall-rope above and outside of the track-ropes.

7. In a hoisting and conveying apparatus, the combination of a trackway, a carriage movable thereon, a fall-rope and means on the carriage for conducting the fall-rope above and outside of and returning it beneath said trackway and a burden-carrier supported from said fall-rope.

8. In a hoisting and conveying apparatus, the combination with a trackway of a carriage movable thereon, traction means for reciprocating the carriage, a fall-rope in two sections operatable in unison with the moving carriage, direction-pulleys upon the carriage for conducting the sections above and outside of the trackway and returning them beneath the carriage, a burden-carrier supported by said sections and means for moving one section relative to the other.

9. In a hoisting and conveying apparatus, the combination of a trackway, a carriage thereon, inhaul and outhaul ropes connected with said carriage, a fall-rope in two sections, fall-rope supporters, direction-pulleys upon the carriage to conduct the fall-rope sections above and outside of and beneath the carriage, means by which the inhaul and outhaul ropes and the fall-rope sections are moved in unison, and means for giving one of said fall-rope sections a movement independent of the other.

10. In hoisting and conveying apparatus, the combination of a trackway, a carriage movable thereon, means for reciprocating the carriage, a sectional fall-rope and means upon the carriage for directing the sections of said fall-rope above and outside of and beneath the carriage, a block with which each of said sections connects, flexible connections between said blocks, a fall-block supported upon said flexible connections and means for giving movement to one of said fall-rope sections to move its block relative to the other.

11. In a hoisting and conveying apparatus, the combination of a trackway, a carriage thereon, a fall-rope, means upon the carriage for directing said fall-rope above and outside of and beneath said carriage, a fall-block supported by said fall-rope, a burden-carrier carried by said fall-block and connections between the fall-rope and the burden-carrier to discharge the latter automatically.

12. In hoisting and conveying apparatus, the combination with a trackway and a carriage thereon, of a fall-rope in two sections extending from the hoist to and beneath the carriage, burden-supporting means between the ends of the sections, each section supporting an equal portion of the load, said fall-rope sections adapted to pay out equally and in unison whereby the perfect equilibrium of the burden may be maintained during transit, and means for giving one section a movement independent of the other to effect the dump.

13. In hoisting and conveying apparatus, the combination with a trackway, a carriage, traction-cables and a hoist, of a combined fall-rope and dumping-rope having two load-supporting sections extending from the hoist to and beneath the carriage, and each adapted to support an equal portion of the load.

14. In a hoisting and conveying apparatus, the combination of head and tail supports, track-ropes between said supports, a carriage movable on said track-ropes, a fall-rope, fall-rope carriers fixedly secured to said track-ropes, a burden-carrier beneath the carriage and connections between the fall-rope and burden-carrier extending above and outside of the track-ropes.

15. In hoisting and conveying apparatus, the combination with an overhead trackway and a carriage thereon, of two fall-line sections supported from said carriage and having their terminals extending below said carriage, blocks carried by said lines, flexible connections independent of the fall-lines between said blocks, and a burden-carrier supported by said connections, one of said fall-line sections movable relative to the other section to effect the dump.

16. In hoisting and conveying apparatus, the combination with an overhead trackway and a carriage thereon, of two fall-line sections supported by said carriage, a block carried by each section, connections between said blocks, and a burden-carrying block carried by said connections, one of said fall-line sections movable relative to the other section to effect the dump.

17. In hoisting and conveying apparatus, the combination with an overhead trackway and a carriage thereon, of two fall-line sections, one movable relative to the other to effect the dump said sections supported from the carriage, a flexible support intermediate of the terminal of said sections, and a burden-carrier movable on said intermediate support.

18. In hoisting and conveying apparatus, the combination with an overhead trackway, and a carriage thereon, of fall-line sections supported from the carriage, a flexible support intermediate of the terminals of said sections, a burden-carrier on said intermediate support, and means operatable by the movement of one section relative to the other to effect the dump.

19. In hoisting and conveying apparatus, the combination with an overhead trackway and a carriage thereon, of two fall-line sections supported from the carriage, a block carried by each section, a flexible connection between said blocks, a burden-carrier on said flexible connection, and means operatable by the movement of one block relative to the other to effect the dump.

20. In apparatus of the class described, the combination with a trackway, a carriage and a hoist, of a burden-carrier, two supporting-lines each sustaining an equal portion of the weight of said carrier, spaced pulleys beneath one of said lines, a pulley above said line and movable intermediate of said spaced pulleys and means for reciprocating said superposed pulley.

In testimony whereof I have hereunto set my hand in presence of two subscribing witnesses.

FREDERICK R. FRENCH.

Witnesses:
   MATTHEW BRADY,
   JOHN McQ. FRENCH.